United States Patent
Tanimura et al.

(10) Patent No.: US 9,464,585 B2
(45) Date of Patent: *Oct. 11, 2016

(54) EXHAUST GAS RECIRCULATION CONTROL SYSTEM OF ENGINE

(71) Applicant: Mazda Motor Corporation, Aki-gun, Hiroshima (JP)

(72) Inventors: Kenji Tanimura, Hiroshima (JP); Kota Maekawa, Hiroshima (JP); Eiji Nakai, Hiroshima (JP); Motoshi Kataoka, Hiroshima (JP); Masanobu Kanno, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 126 days.

This patent is subject to a terminal disclaimer.

(21) Appl. No.: 14/470,776

(22) Filed: Aug. 27, 2014

(65) Prior Publication Data

US 2015/0089938 A1 Apr. 2, 2015

(30) Foreign Application Priority Data

Sep. 30, 2013 (JP) ................................ 2013-204093

(51) Int. Cl.
*F02B 33/44* (2006.01)
*F02M 25/07* (2006.01)
(Continued)

(52) U.S. Cl.
CPC ......... *F02D 41/0065* (2013.01); *F02B 37/225* (2013.01); *F02D 41/0052* (2013.01); *F02D 41/0072* (2013.01); *F02D 41/0225* (2013.01);
(Continued)

(58) Field of Classification Search
CPC .......... F02D 41/0065; F02D 41/0052; F02D 41/0225; F02B 37/226; F02M 25/0707; F02M 25/0709; F02M 25/0713; F02M 25/0728
USPC ........ 60/605.2; 701/108; 123/568.11, 568.12
See application file for complete search history.

(56) References Cited

U.S. PATENT DOCUMENTS 6,823,660 B2 * 11/2004 Minami .................... F02D 9/04
60/295
6,865,882 B2 * 3/2005 Minami ................ F02D 41/024
60/295

(Continued)

FOREIGN PATENT DOCUMENTS

EP 1808591 A2 * 7/2007
EP 1870584 A2 * 12/2007
(Continued)

*Primary Examiner* — Thai Ba Trieu
(74) *Attorney, Agent, or Firm* — Alleman Hall McCoy Russell & Tuttle LLP

(57) ABSTRACT

An exhaust gas recirculation control device of an engine is provided. The device includes: an exhaust turbocharger having a turbine disposed in an exhaust passage and a compressor disposed in an intake passage; a low-pressure EGR passage connecting a part of the exhaust passage downstream of the turbine to a part of the intake passage upstream of the compressor; a low-pressure EGR valve disposed in the low-pressure EGR passage and for changing a cross-sectional area of the low-pressure EGR passage; an exhaust shutter valve disposed downstream of the connected part of the exhaust passage to the low-pressure EGR passage, and for changing a cross-sectional area of the exhaust passage; a valve control device for controlling openings of the low-pressure EGR valve and the exhaust shutter valve; and a gear range detector for detecting a gear range of a transmission of a vehicle in which the engine is installed.

6 Claims, 8 Drawing Sheets

(51) Int. Cl.
*F02D 41/00* (2006.01)
*F02B 37/22* (2006.01)
*F02D 41/02* (2006.01)

(52) U.S. Cl.
CPC ............. *F02M 26/05* (2016.02); *F02M 26/06* (2016.02); *F02M 26/10* (2016.02); *F02M 26/25* (2016.02); *Y02T 10/47* (2013.01)

(56) References Cited

U.S. PATENT DOCUMENTS

| | | | | |
|---|---|---|---|---|
| 7,717,099 B2 * | 5/2010 | Nagae | ................ | F02D 41/0055 123/568.21 |
| 7,937,213 B2 * | 5/2011 | Buis | ................... | F02D 41/0052 701/108 |
| 8,001,953 B2 * | 8/2011 | Murata | .............. | F02D 41/0052 123/568.21 |
| 8,033,272 B2 * | 10/2011 | Morizane | ............... | F02B 37/04 123/565 |
| 8,196,404 B2 * | 6/2012 | Onishi | ............... | F02D 41/0065 60/605.2 |
| 8,220,443 B2 * | 7/2012 | Murata | .............. | F02D 41/0065 60/605.2 |
| 8,291,697 B2 * | 10/2012 | Matsumoto | ......... | F02D 41/0275 60/295 |
| 8,555,615 B2 * | 10/2013 | Murata | .................... | F02D 9/04 60/285 |
| 9,010,113 B2 * | 4/2015 | Harima | ............. | F02M 25/0702 60/605.2 |
| 2009/0194079 A1 * | 8/2009 | Nagae | ................ | F02D 41/0007 123/568.11 |
| 2009/0199824 A1 * | 8/2009 | Buis | .................... | F02D 41/0052 123/568.21 |
| 2009/0223221 A1 * | 9/2009 | Onishi | ............... | F02D 41/0065 123/568.11 |
| 2009/0283077 A1 * | 11/2009 | Murata | .............. | F02D 41/0065 123/568.16 |
| 2010/0018187 A1 * | 1/2010 | Matsumoto | ......... | F02D 41/0275 60/286 |
| 2010/0050999 A1 * | 3/2010 | Murata | .............. | F02D 41/0052 60/605.2 |
| 2010/0126142 A1 * | 5/2010 | Murata | .................... | F02D 9/04 60/285 |
| 2015/0059680 A1 * | 3/2015 | Yoshida | ................... | F02D 9/04 701/102 |
| 2015/0089941 A1 * | 4/2015 | Maekawa | ........... | F02D 41/0007 60/605.2 |
| 2015/0089942 A1 * | 4/2015 | Kihara | ............... | F02D 41/0072 60/605.2 |
| 2015/0192087 A1 * | 7/2015 | Shirahashi | .......... | F02D 41/0007 701/104 |

FOREIGN PATENT DOCUMENTS

| | | | | |
|---|---|---|---|---|
| JP | 2007211767 A | * | 8/2007 | |
| JP | 2007292028 A | | 11/2007 | |
| JP | 2008002347 A | * | 1/2008 | |
| JP | 2008002351 A | * | 1/2008 | |
| JP | 2008008205 A | * | 1/2008 | |
| JP | 2008175139 A | * | 7/2008 | |
| JP | 2008184925 A | * | 8/2008 | |
| WO | WO 2008001194 A1 | * | 1/2008 | ............... F02D 9/04 |

* cited by examiner

EXHAUST GAS RECIRCULATION CONTROL SYSTEM OF ENGINE

BACKGROUND

The present invention relates to an exhaust gas recirculation control device of an engine.

Conventionally, exhaust gas recirculation (EGR) control devices of engines are known. For example, JP2007-292028A discloses such an exhaust gas recirculation control device, which includes an exhaust turbocharger, a low-pressure EGR passage, a low-pressure EGR valve, and an exhaust shutter valve (exhaust throttle valve). The exhaust turbocharger has a turbine disposed in an exhaust passage of the engine and a compressor disposed in an intake passage of the engine. The low-pressure EGR passage connects a part of the exhaust passage downstream of the turbine to a part of the intake passage upstream of the compressor. The low-pressure EGR valve is disposed in the low-pressure EGR passage and changes a cross-sectional area of the low-pressure EGR passage. The exhaust shutter valve is disposed in a part of the exhaust passage downstream of the connected part to the low-pressure EGR passage, and changes a cross-sectional area of the exhaust passage. In JP2007-292028A, the control device also includes a high-pressure EGR passage connecting a part of the exhaust passage upstream of the turbine to a part of the intake passage downstream of the compressor, and a high-pressure EGR valve disposed in the high-pressure EGR passage and for changing a cross-sectional area of the high-pressure EGR passage.

In JP2007-292028A, an amount of exhaust gas recirculated from the engine by the low-pressure EGR passage is adjusted by controlling openings of the low-pressure EGR valve and the exhaust shutter valve. In this case, when the recirculation amount of exhaust gas is small, the exhaust shutter valve is fully opened and the opening of the low-pressure EGR valve is controlled to adjust the recirculation amount of exhaust gas. When the low-pressure EGR valve is fully opened and the recirculation amount cannot be increased anymore, the exhaust shutter valve is narrowed while the low-pressure EGR valve is fully opened, so as to increase the recirculation amount.

As disclosed in JP2007-292028A, when the recirculation amount of exhaust gas is small, by fully opening the exhaust shutter valve and controlling the low-pressure EGR valve to adjust the recirculation amount of exhaust gas, an exhaust pressure loss of the turbine can be reduced as much as possible, and a fuel consumption can be maintained low.

Here, when a transmission of a vehicle in which the engine is installed is in a low-speed gear range (e.g., a first or second gear range), an engine speed changes greatly with respect to an accelerator position, and a target recirculation amount also changes greatly according to the change in the engine speed. In this case, if the exhaust shutter valve is fully opened, a difference between pressures on the exhaust passage side and the intake passage side of the low-pressure EGR valve in the low-pressure EGR passage is comparatively small. Therefore, while the target recirculation amount changes greatly, in order to achieve the changed target recirculation amount by the low-pressure EGR valve, an opening of the low-pressure EGR valve needs to be changed greatly, which causes a problem that a follow-up responsiveness of the opening of the low-pressure EGR valve with respect to the change in the target recirculation amount degrades.

SUMMARY

The present invention is made in view of the above situations and aims to reduce an exhaust pressure loss of a turbine as much as possible when an engine is in operation with a transmission being in other than a low-speed gear range, and to improve a follow-up responsiveness of an opening of a low-pressure EGR valve with respect to a change in a target recirculation amount when the engine is in operation with the transmission being in the low-speed gear range.

According to one aspect to the present invention, an exhaust gas recirculation control device of an engine is provided. The exhaust gas recirculation control device includes an exhaust turbocharger, a low-pressure EGR passage, a low-pressure EGR valve, an exhaust shutter valve, and a valve control device. The exhaust turbocharger has a turbine disposed in an exhaust passage of the engine and a compressor disposed in an intake passage. The low-pressure EGR passage connects a part of the exhaust passage downstream of the turbine to a part of the intake passage upstream of the compressor. The low-pressure EGR valve is disposed in the low-pressure EGR passage and changes a cross-sectional area of the low-pressure EGR passage. The exhaust shutter valve is disposed downstream of the connected part of the exhaust passage to the low-pressure EGR passage and changes a cross-sectional area of the exhaust passage. The valve control device controls openings of the low-pressure EGR valve and the exhaust shutter valve so that an amount of exhaust gas of the engine recirculated by the low-pressure EGR passage becomes a low-pressure EGR target recirculation amount that is set in advance according to an operating state of the engine.

The exhaust gas recirculation control device also includes a gear range detector for detecting a gear range of a transmission of a vehicle in which the engine is installed. In a case where the gear range detected by the gear range detector is other than a predetermined low-speed gear range, when the low-pressure EGR target recirculation amount is smaller than a predetermined amount, the valve control device fixes the exhaust shutter valve fully open and sets the opening of the low-pressure EGR valve to an opening that allows the recirculation amount of exhaust gas to be the low-pressure EGR target recirculation amount, and when the low-pressure EGR target recirculation amount is larger than the predetermined amount, the valve control device fixes the low-pressure EGR valve fully open and sets the opening of the exhaust shutter valve to an opening that allows the recirculation amount of exhaust gas to be the low-pressure EGR target recirculation amount. In a case where the gear range detected by the gear range detector is the predetermined low-speed gear range, the valve control device sets the opening of the exhaust shutter valve to a predetermined opening that is larger than fully closed but smaller than fully open according to the low-pressure EGR target recirculation amount, and sets the opening of the low-pressure EGR valve to an opening that allows the recirculation amount of the exhaust gas to be the low-pressure EGR target recirculation amount.

With this configuration, in the case where the gear range of the transmission is other than the predetermined low-speed gear range, since the exhaust shutter valve is fixed fully open when the low-pressure EGR target recirculation amount is smaller than the predetermined amount, an exhaust pressure loss of the turbine can be reduced. Moreover, when the low-pressure EGR target recirculation amount is larger than the predetermined amount, the exhaust shutter valve is narrowed gradually as the low-pressure EGR target recirculation amount becomes larger, and thus, the exhaust pressure loss of the turbine can be reduced as much as possible. On the other hand, in the case where the gear range of the transmission is the predetermined low-speed gear range, since the opening of the exhaust shutter valve is set to the opening that is larger than fully closed but smaller than fully open according to the low-pressure EGR target recirculation amount, a difference between pressures on the exhaust passage side and the intake passage side of the low-pressure EGR valve in the low-pressure EGR passage becomes large. Thereby, while the low-pressure EGR target recirculation amount changes greatly, a required change amount of an opening of the low-pressure EGR valve for achieving the changed low-pressure EGR target recirculation amount can be small. As a result, a follow-up responsiveness of the opening of the low-pressure EGR valve with respect to the change in the low-pressure EGR target recirculation amount can be improved.

The exhaust gas recirculation control device may also include a total intake gas amount detector for detecting a total intake gas amount introduced into the engine, and a fresh air amount detector for detecting a fresh air amount introduced into the engine. In the case where the gear range detected by the gear range detector is other than the predetermined low-speed gear range, when the low-pressure EGR target recirculation amount is smaller than the predetermined amount, in the state where the exhaust shutter valve is fixed fully open, the valve control device may perform a feedback control of the opening of the low-pressure EGR valve so that an actual recirculation amount becomes the low-pressure EGR target recirculation amount, and when the low-pressure EGR target recirculation amount is larger than the predetermined amount, in the state where the low-pressure EGR valve is fixed fully open, the valve control device may perform a feedback control of the opening of the exhaust shutter valve so that the actual recirculation amount becomes the low-pressure EGR target recirculation amount, the actual recirculation amount calculated by subtracting the fresh air amount detected by the fresh air amount detector from the total intake gas amount detected by the total intake gas amount detector. In the case where the gear range detected by the gear range detector is the predetermined low-speed gear range, in the state where the opening of the exhaust shutter valve is set to the predetermined opening, the valve control device may perform the feedback control of the opening of the low-pressure EGR valve so that the actual recirculation amount becomes the low-pressure EGR target recirculation amount.

Therefore, even if the gear range of the transmission is the predetermined low-speed gear range or other than this range, by the feedback control, the amount of exhaust gas recirculated by the low-pressure EGR passage can be accurately adjusted to the low-pressure EGR target recirculation amount. Moreover, when the gear range is the predetermined low-speed gear range, the reason why the feedback control is performed on the opening of the low-pressure EGR valve instead of the opening of the exhaust shutter valve is because the controllability of the feedback control can be improved. Specifically, while the exhaust shutter valve is a valve for changing the cross-sectional area of the exhaust passage having a large diameter, the low-pressure EGR valve is a valve for changing the cross-sectional area of the low-pressure EGR passage having a smaller diameter than that of the exhaust passage, and thereby, the low-pressure EGR valve can control the recirculation amount more finely than the exhaust shutter valve. As a result, the controllability of the feedback control can be improved.

The exhaust gas recirculation control device which performs the feedback control as described above may also include a high-pressure EGR passage and a high-pressure EGR valve. The high-pressure EGR passage connects a part of the exhaust passage upstream of the turbine to a part of the intake passage downstream of the compressor. The high-pressure EGR valve is disposed in the high-pressure EGR passage and changes a cross-sectional area of the high-pressure EGR passage. In a case of recirculating the exhaust gas by both of the low-pressure and high-pressure EGR passages, the valve control device may perform a basic control of an opening of the high-pressure EGR valve so that the amount of exhaust gas of the engine recirculated by the high-pressure EGR passage becomes a high-pressure EGR target recirculation amount that is set in advance according to the operating state of the engine. In the case of recirculating the exhaust gas by both of the low-pressure and high-pressure EGR passages, in the feedback control of the opening of either one of the low-pressure EGR valve and the exhaust shutter valve, the valve control device may use, instead of the actual recirculation amount, a low-pressure EGR actual recirculation amount to perform the feedback control so that the low-pressure EGR actual recirculation amount becomes the low-pressure EGR target recirculation amount, the low-pressure EGR actual recirculation amount calculated by subtracting the fresh air amount detected by the fresh air amount detector and the high-pressure EGR target recirculation amount from the total intake gas amount detected by the total intake gas amount detector. In the case of recirculating the exhaust gas by both of the low-pressure and high-pressure EGR passages, the valve control device may perform a first correction control on the opening of the high-pressure EGR valve set in the basic control so that the amount of exhaust gas recirculated by the high-pressure EGR passage is corrected by an amount corresponding to a deviation between the low-pressure EGR actual recirculation amount and the low-pressure EGR target recirculation amount in the feedback control.

Specifically, in the feedback control in the control of the recirculation of the exhaust gas by the low-pressure EGR passage, a time delay occurs for the low-pressure EGR actual recirculation amount, which is the actual amount of exhaust gas recirculated by the low-pressure EGR passage, to become the low-pressure EGR target recirculation amount, and during the time delay, an excess/deficiency of the low-pressure EGR actual recirculation amount with respect to the low-pressure EGR target recirculation amount occurs. Therefore, when the exhaust gas is recirculated by both of the low-pressure and high-pressure EGR passages, first, the opening of either one of the low-pressure EGR valve and the exhaust shutter valve is feedback-controlled so that the low-pressure EGR actual recirculation amount becomes the low-pressure EGR target recirculation amount. Then, the excess/deficiency amount of the low-pressure EGR actual recirculation amount with respect to the low-pressure EGR target recirculation amount caused by the time delay in the feedback control is corrected on the high-pressure EGR valve side. In other words, when the low-pressure EGR actual recirculation amount is less than the low-pressure EGR target recirculation amount, the amount of exhaust gas recirculated by the high-pressure EGR passage is increased compared to the amount corresponding to the opening of the high-pressure EGR valve set by the basic control, and when the low-pressure EGR actual recirculation amount exceeds the low-pressure EGR target recirculation amount, the amount of exhaust gas recirculated by the high-pressure EGR passage is reduced compared to the amount corresponding to the opening of the high-pressure EGR valve set by the basic control, so that the total amount of exhaust gas recirculated by the low-pressure and high-pressure EGR passages becomes a total target recirculation amount which is the sum of the low-pressure EGR target recirculation amount and the high-pressure EGR target recirculation amount. By correcting on the high-pressure EGR valve side as above, the total amount of exhaust gas recirculated by the low-pressure and high-pressure EGR passages can be adjusted to the total target recirculation amount more accurately compared to the case of only performing the feedback control.

The deviation may be a deviation between the low-pressure EGR actual recirculation amount at a timing before a current timing by a predetermined period of time and the low-pressure EGR target recirculation amount at the current timing. The predetermined time period may correspond to a delayed period of time for the exhaust gas recirculated by the low-pressure EGR passage to arrive at the part of the intake passage connected to the high-pressure EGR passage, compared to the exhaust gas recirculated by the high-pressure EGR passage.

Specifically, since the connected part of the intake passage to the low-pressure EGR passage is positioned upstream of the connected part to the high-pressure EGR passage, the exhaust gas recirculated by the low-pressure EGR passage arrives at the connected part of the intake passage to the high-pressure EGR passage (and consequently to the engine) with the predetermined period of time of delay compared to the exhaust gas recirculated by the high-pressure EGR passage. Thus, a more accurate deviation can be obtained through correcting the amount of exhaust gas recirculated by the high-pressure EGR passage by the deviation amount between the low-pressure EGR actual recirculation amount at the timing before the current timing by the predetermined time period and the low-pressure EGR target recirculation amount at the current timing. As a result, the total amount of exhaust gas recirculated by the low-pressure and high-pressure EGR passages can be adjusted to the total target recirculation amount more accurately.

In the case where the first correction control described above is performed, when the low-pressure EGR target recirculation amount is changed, for a predetermined period of time from the change in the low-pressure EGR target recirculation amount, the valve control device may perform, instead of the first correction control, a second correction control on the opening of the high-pressure EGR valve set in the basic control so that the amount of exhaust gas recirculated by the high-pressure EGR passage is corrected by an amount corresponding to a difference between the low-pressure EGR target recirculation amounts before and after being changed. The predetermined time period corresponds to a delayed period of time for the exhaust gas recirculated by the low-pressure EGR passage to arrive at the part of the intake passage connected to the high-pressure EGR passage, compared to the exhaust gas recirculated by the high-pressure EGR passage.

Specifically, since the connected part of the intake passage to the low-pressure EGR passage is positioned upstream of the connected part to the high-pressure EGR passage, when the operating state changes and the low-pressure EGR target recirculation amount is changed, even after this change, for the predetermined time period, the exhaust gas flows with the low-pressure EGR target recirculation amount before being changed. Therefore, for the predetermined time period after the change in the low-pressure EGR target recirculation amount, the amount of exhaust gas recirculated by the high-pressure EGR passage is corrected by the amount corresponding to the difference between the low-pressure EGR target recirculation amounts before and after being changed. For example, when the low-pressure EGR target recirculation amount is changed to be smaller than before, for the predetermined time period after the change, the amount of exhaust gas recirculated by the high-pressure EGR passage is reduced. Therefore, also for the predetermined time period after the change in the low-pressure EGR target recirculation amount, the total amount of exhaust gas recirculated by the low-pressure and high-pressure EGR passages can be adjusted to the total target recirculation amount more accurately.

DETAILED DESCRIPTION OF EMBODIMENT

Hereinafter, one embodiment of the present invention is described in detail with reference to the appended drawings.

Figure 1:
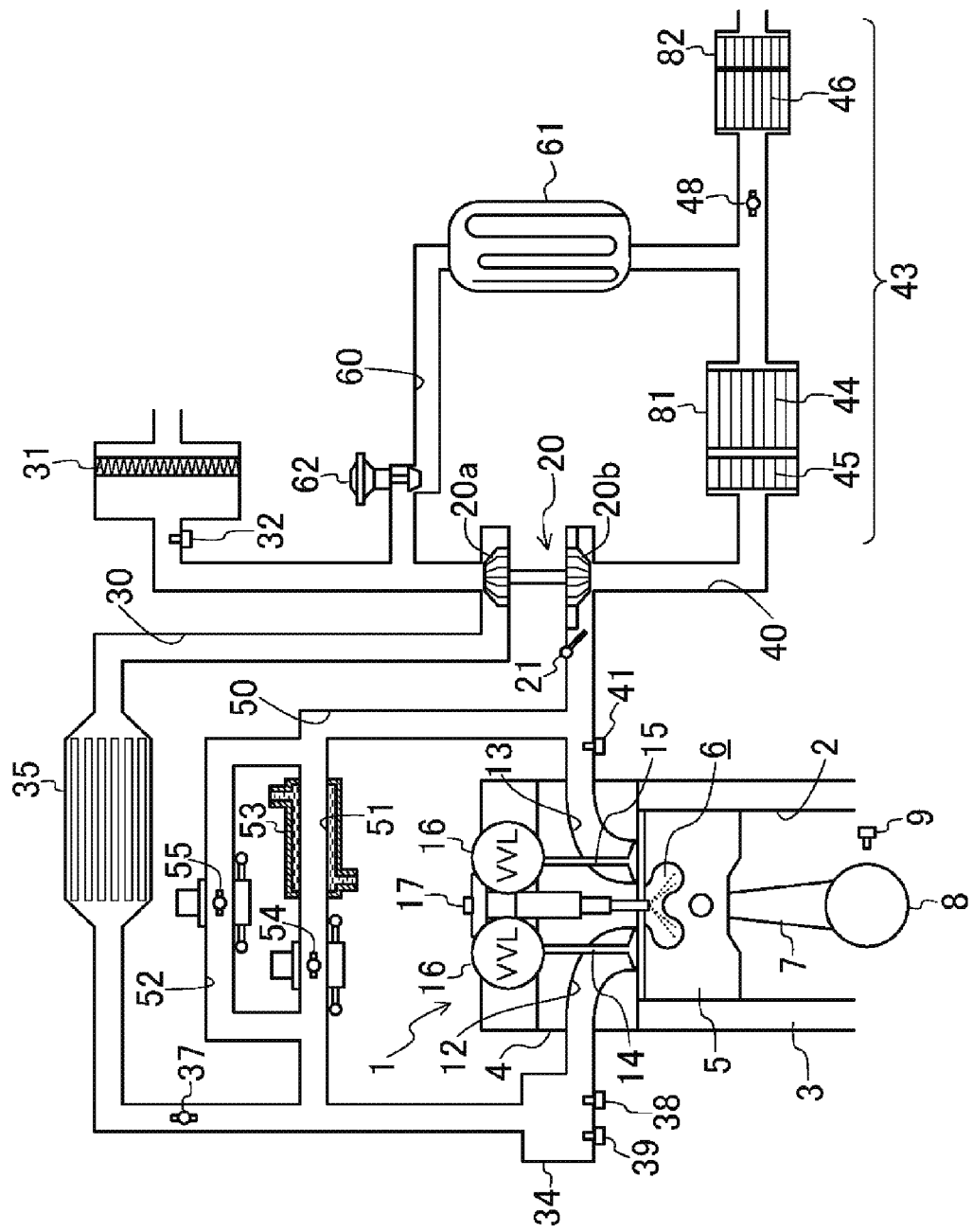
FIG. 1 is a schematic view illustrating a configuration of an engine controlled by an exhaust gas recirculation control device according to one embodiment of the present invention.

FIG. 1 is a schematic view illustrating a configuration of an engine 1 controlled by an exhaust gas recirculation control device of this embodiment. The engine 1 is a diesel engine installed in a vehicle, and includes a cylinder block 3 formed with a plurality of cylinders 2 (only one is illustrated in FIG. 1), and a cylinder head 4 disposed on the cylinder block 3. A piston 5 is reciprocatably fitted into each of the cylinders 2 of the engine 1, and a deep-bowl combustion chamber 6 is formed in a top face of the piston 5. The piston 5 is coupled to a crankshaft 8 via a connecting rod 7. The engine 1 is provided with an engine speed sensor 9 for detecting a speed of the engine 1 by detecting a rotational angular position of the crankshaft 8.

In the cylinder head 4, an intake port 12 and an exhaust port 13 are formed for each cylinder 2, and an intake valve 14 for opening and closing an opening of the intake port 12 on the combustion chamber 6 side and an exhaust valve 15 for opening and closing an opening of the exhaust port 13 on the combustion chamber 6 side are disposed.

Moreover, injectors 17 for injecting fuel are provided in the cylinder head 4. Each injector 17 is arranged such that its fuel injection port is oriented toward an inside of the combustion chamber 6 from a ceiling face of the combustion chamber 6, and to directly inject the fuel into the combustion chamber 6 near a compression top dead center.

The engine 1 is provided with variable valve lift mechanisms (hereinafter, referred to as VVL) 16 for adjusting lifts of the intake and exhaust valves 14 and 15. The VVLs 16 can adjust the lifts of the intake and exhaust valves 14 and 15 so that the valves are fully closed or substantially fully closed.

An intake passage 30 is connected to one side face of the engine 1 to communicate with the intake ports 12 of the respective cylinders 2. An air cleaner 31 for filtering intake air is disposed in an upstream end part of the intake passage 30, and the intake air filtered by the air cleaner 31 is supplied to each combustion chamber 6 of the cylinder 2 via the intake passage 30 and the intake port 12.

An airflow sensor 32 for detecting a flow rate of the intake air introduced into the intake passage 30 is disposed in the intake passage 30, near a downstream side of the air cleaner 31. Moreover, a surge tank 34 is disposed in the intake passage 30, near its downstream end. A part of the intake passage 30 downstream of the surge tank 34 is formed to be independent passages extending to the respective cylinders 2 and a downstream end of each independent passage is connected to the intake port 12 of the cylinder 2.

Further, a compressor 20a of an exhaust turbocharger 20 is disposed in the intake passage 30, between the airflow sensor 32 and the surge tank 34. The intake air is turbocharged by the operation of the compressor 20a.

Furthermore, an intercooler 35 for cooling air compressed by the compressor 20a and an intake shutter valve 37 are disposed in the intake passage 30, between the compressor 20a of the exhaust turbocharger 20 and the surge tank 34, in this order from the upstream side. The intake shutter valve 37 adjusts an amount of intake air to the combustion chambers 6 of the respective cylinders 2, by changing a cross-sectional area of the intake passage 30 at the position where the intake shutter valve 37 is disposed. Moreover, in the surge tank 34, an intake gas temperature sensor 38 for detecting a temperature of gas to be introduced into the cylinders 2 of the engine 1 (i.e., a temperature of intake air), and an intake pressure sensor 39 for detecting a pressure of gas to be introduced into the cylinders 2 of the engine 1.

An exhaust passage 40 through which exhaust gas from the combustion chamber 6 of each cylinder 2 is discharged is connected to the other side face of the engine 1. An upstream part of the exhaust passage 40 is comprised of an exhaust manifold having independent passages extending to the respective cylinders 2 and connected to respective external ends of the exhaust ports 13, and a merging part where the independent passages merge. In a part of the exhaust passage 40 downstream of the exhaust manifold, a turbine 20b of the exhaust turbocharger 20 is disposed. The turbine 20b rotates by the exhaust gas flow, and the compressor 20a coupled to the turbine 20b is operated by the rotation of the turbine 20b.

A VGT (variable-geometry turbocharger) throttle valve 21 is provided in the exhaust passage 40 near the upstream side of the turbine 20b. By controlling an opening (throttle amount) of the VGT throttle valve 21, a flow speed of the exhaust gas to the turbine 20b can be adjusted, and thus, a rotational speed of the turbine 20b which rotates by the exhaust gas flow, in other words, a compression ratio of the compressor 20a of the exhaust turbocharger 20 (a ratio of a gas pressure immediately after flowing out from the compressor 20a with respect to a gas pressure immediately before flowing into the compressor 20a) can be adjusted.

An exhaust emission control system 43 for purifying hazardous components within the exhaust gas is disposed in the exhaust passage 40, downstream of the turbine 20b of the exhaust turbocharger 20. The exhaust emission control system 43 includes a particulate filter 44, an oxidative catalyst 45, and a lean $NO_x$ catalyst 46. The particulate filter 44 captures particulate matter (e.g., soot) within the exhaust gas. The oxidative catalyst 45 is disposed upstream of the particulate filter 44, carries, for example, platinum or a mixture of platinum with palladium, and oxidizes CO and HC (hydrocarbons) within the exhaust gas. The lean $NO_x$ catalyst 46 is disposed downstream of the particulate filter 44, processes (traps) $NO_x$ within the exhaust gas, and suppresses discharge of $NO_x$ to the atmosphere. The particulate filter 44 and the oxidative catalyst 45 are contained in a first case 81. The lean $NO_x$ catalyst 46 is contained in a second case 82, different from the first case 81. The second case 82 is disposed separately toward the downstream side from the first case 81.

The engine 1 is configured such that a part of the exhaust gas is recirculated from the exhaust passage 40 to the intake passage 30. A high-pressure EGR passage 50 and a low-pressure EGR passage 60 are provided for the recirculation of the exhaust gas.

The high-pressure EGR passage 50 connects a part of the exhaust passage 40 upstream of the turbine 20b of the exhaust turbocharger 20 to a part of the intake passage 30 downstream of the compressor 20a. More specifically, the high-pressure EGR passage 50 connects a part of the exhaust passage 40 between the exhaust manifold and the turbine 20b of the exhaust turbocharger 20 to a part of the intake passage 30 between the intake shutter valve 37 and the surge tank 34.

The high-pressure EGR passage 50 includes a cooler-side passage 51 for cooling and recirculating the exhaust gas, and a cooler bypass-side passage 52 for recirculating the exhaust gas with the temperature remaining as it is. The cooler-side passage 51 is provided with a high-pressure EGR cooler 53 for cooling the exhaust gas passing thereinside. The cooler bypass-side passage 52 is a passage bypassing the high-pressure EGR cooler 53. Moreover, a cooler-side EGR valve 54 for changing a cross-sectional area of the cooler-side passage 51 is disposed in the cooler-side passage 51 downstream of the high-pressure EGR cooler 53, and a cooler bypass-side EGR valve 55 for changing a cross-sectional area of the cooler bypass-side passage 52 is disposed in the cooler bypass-side passage 52. The cooler-side EGR valve 54 and the cooler bypass-side EGR valve 55 together configure a high-pressure EGR valve and adjust the amount of exhaust gas recirculated by the high-pressure EGR passage 50 (the cooler-side passage 51 and the cooler bypass-side passage 52).

The low-pressure EGR passage 60 connects a part of the exhaust passage 40 downstream of the turbine 20b to a part of the intake passage 30 upstream of the compressor 20a. More specifically, the low-pressure EGR passage 60 connects a part of the exhaust passage 40 between the particulate filter 44 and the lean $NO_x$ catalyst 46 (a part between the first case 81 and the second case 82) to a part of the intake passage 30 between the airflow sensor 32 and the compressor 20a. A low-pressure EGR cooler 61 for cooling the exhaust gas passing thereinside is disposed in the low-pressure EGR passage 60. Moreover, a low-pressure EGR valve 62 for changing a cross-sectional area of the low-pressure EGR passage 60 is disposed in the low-pressure EGR passage 60 downstream of the low-pressure EGR cooler 61.

An exhaust shutter valve 48 is disposed in the exhaust passage 40 downstream of the connected part to the low-pressure EGR passage 60 (and upstream of the lean $NO_x$ catalyst 46). The exhaust shutter valve 48 changes a cross-sectional area of the part of the exhaust passage 40 where the exhaust shutter valve 48 is disposed, and when the cross-sectional area becomes smaller (an opening of the exhaust shutter valve 48 becomes smaller), a pressure in the part of the exhaust passage 40 connected to the low-pressure EGR passage 60 increases and a difference between pressures on the exhaust passage 40 side and the intake passage 30 side of the low-pressure EGR valve 62 in the low-pressure EGR passage 60 becomes large. Therefore, by controlling an opening of the low-pressure EGR valve 62 and the opening of the exhaust shutter valve 48, the amount of exhaust gas recirculated by the low-pressure EGR passage 60 is adjusted.

Moreover, an exhaust pressure sensor 41 for detecting a pressure of the exhaust gas discharged from the engine 1 is disposed in the exhaust passage 40 near the upstream side of the connected part to the high-pressure EGR passage 50.

Figure 2:
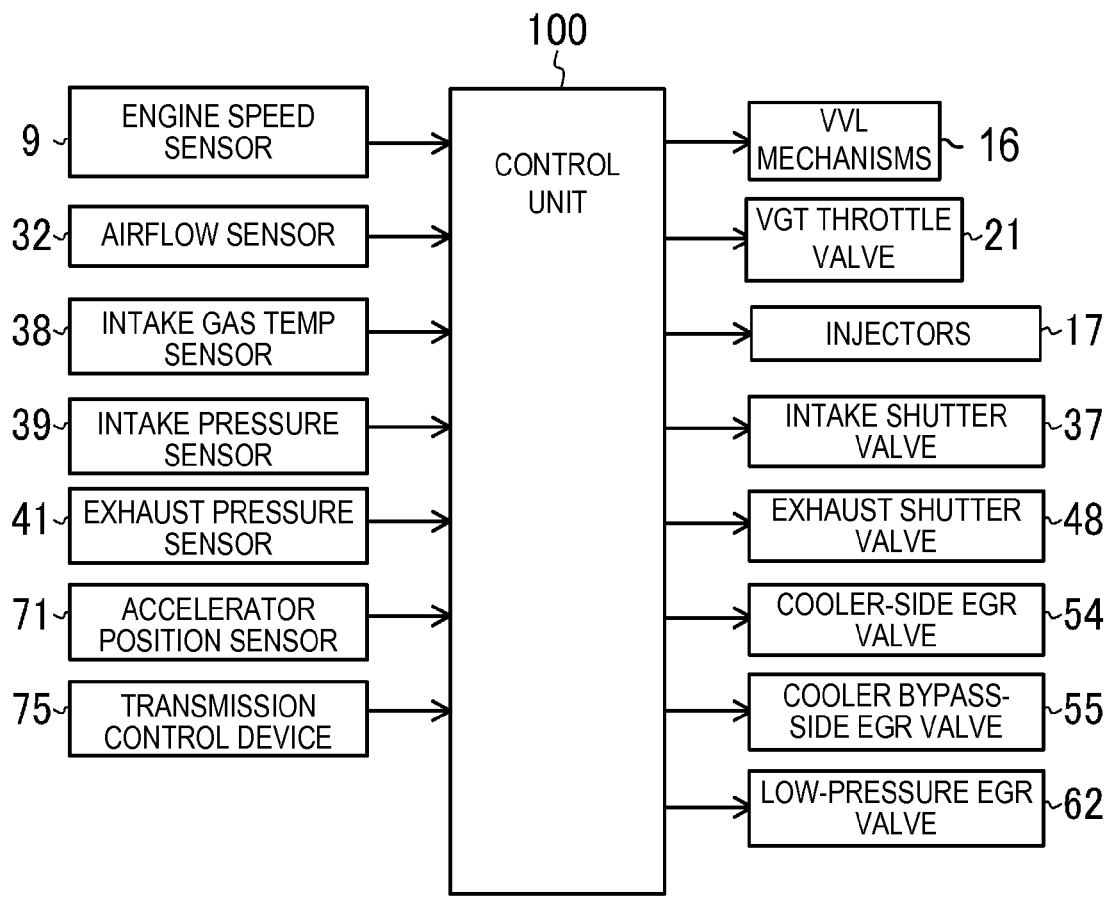
FIG. 2 is a block diagram illustrating a configuration of a control system of the exhaust gas recirculation control device.

As illustrated in FIG. 2, signals of values of sensors including the engine speed sensor 9, the airflow sensor 32, the intake gas temperature sensor 38, the intake pressure sensor 39, the exhaust pressure sensor 41, and an accelerator position sensor 71 for detecting an accelerator position are inputted to a control unit 100 for controlling the engine 1. Moreover, the control unit 100 receives, from a transmission control device 75 for controlling an automatic transmission (automatic transmission having six forward and reverse gear ranges in this embodiment) of the vehicle, a signal relating to information of a current gear range of the automatic transmission. Thus, the transmission control device 75 configures a gear range detector for detecting the gear range of the transmission of the vehicle in which the engine 1 is installed.

The control unit 100 is a controller based on a well-known microcomputer, and includes a central processing unit (CPU) for executing program(s), a memory comprised of, for example, a RAM and/or a ROM and for storing the program(s) and data, and an input/output (I/O) bus for inputting and outputting electric signals.

Further, based on the input signals, the control unit 100 controls the VVLs 16, the injectors 17, the VGT throttle valve 21, the intake shutter valve 37, the exhaust shutter valve 48, the cooler-side EGR valve 54, the cooler bypass-side EGR valve 55, and the low-pressure EGR valve 62.

According to an operating state of the engine 1, the control unit 100 determines a low-pressure EGR target recirculation amount which is a target value of the amount of exhaust gas recirculated by the low-pressure EGR passage 60, and a high-pressure EGR target recirculation amount which is a target value of the amount of exhaust gas recirculated by the high-pressure EGR passage 50. In this embodiment, based on the signals from the engine speed sensor 9 and the accelerator position sensor 71, in other words, based on an engine speed Ne and an engine load PE, the control unit 100 determines the low-pressure EGR target recirculation amount and the high-pressure EGR target recirculation amount, according to the map in FIG. 3.

An "LP" region of the map where either one of the engine load and the engine speed is high is a region where the exhaust gas is recirculated only by the low-pressure EGR passage 60. In the "LP" region of the map, the low-pressure EGR target recirculation amount is set in advance based on the engine speed Ne and the engine load PE, and the high-pressure EGR target recirculation amount is set to zero in advance. Thus, the cooler-side EGR valve 54 and the cooler bypass-side EGR valve 55 are fully closed so that all the exhaust gas is led to the turbine 20b of the exhaust turbocharger 20 and turbocharged in a high engine load range where a high torque is needed.

A "cooler-side HP+LP" region of the map where either one of the engine load and the engine speed is medium is a region where the exhaust gas is recirculated by the cooler-side passage 51 of the high-pressure EGR passage 50 and the low-pressure EGR passage 60, but not by the cooler bypass-side passage 52 (the cooler bypass-side EGR valve 55 is fully closed). In the "cooler-side HP+LP" region of the map, the low-pressure EGR target recirculation amount and the high-pressure EGR target recirculation amount are set in advance based on the engine speed Ne and the engine load PE.

A "cooler bypass-side HP+LP" region of the map where either one of the engine load and the engine speed is low is a region where the exhaust gas is recirculated by the cooler bypass-side passage 52 of the high-pressure EGR passage 50 and the low-pressure EGR passage 60 but not by the cooler-side passage 51 (the cooler-side EGR valve 54 is fully closed). In the "cooler bypass-side HP+LP" region of the map, the low-pressure EGR target recirculation amount and the high-pressure EGR target recirculation amount are set in advance based on the engine speed Ne and the engine load PE.

In the "LP" region, the control unit 100 controls the openings of the low-pressure EGR valve 62 and the exhaust shutter valve 48 so that the amount of exhaust gas recirculated by the low-pressure EGR passage 60 becomes the low-pressure EGR target recirculation amount set in advance in the map. Thus, the control unit 100 configures a valve control device.

Figure 4:
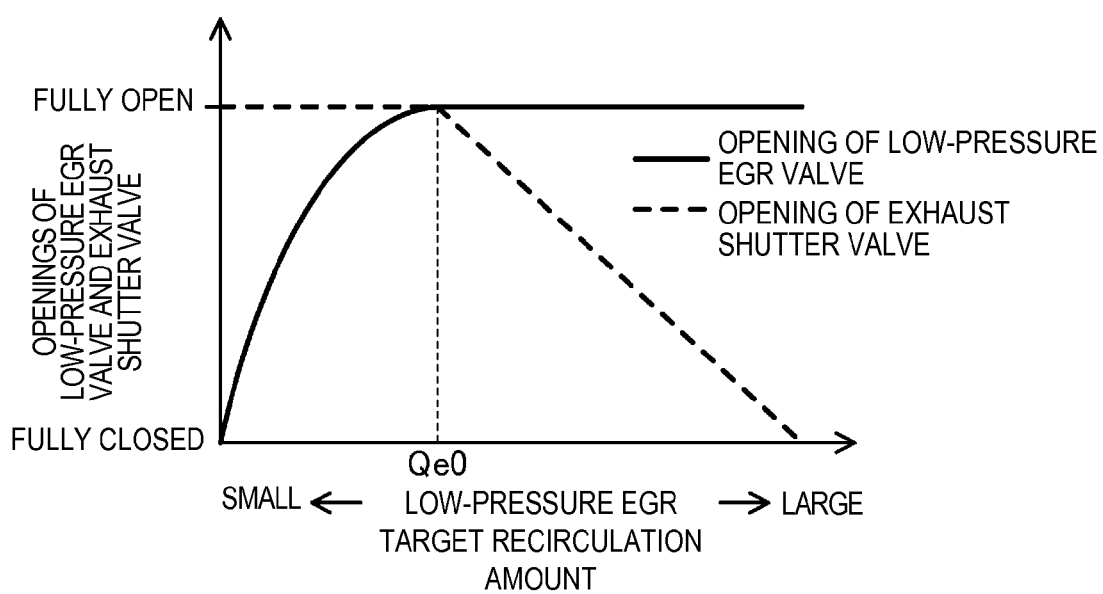
FIG. 4 is a chart illustrating a relationship between the low-pressure EGR target recirculation amount and each of openings of a low-pressure EGR valve and an exhaust shutter valve, when an automatic transmission is in other than a first gear range.

Specifically, in a case where the gear range of the automatic transmission inputted from the transmission control device 75 is other than a predetermined low-speed gear range (in this embodiment, a first gear range), in other words, the gear range is any one of second to sixth gear ranges in this embodiment, when the low-pressure EGR target recirculation amount is smaller than a predetermined amount Qe0, as illustrated in FIG. 4, the control unit 100 fixes the exhaust shutter valve 48 fully open and sets the opening of the low-pressure EGR valve 62 to an opening which allows the recirculation amount of exhaust gas to be the low-pressure EGR target recirculation amount.

The opening of the low-pressure EGR valve 62 when the low-pressure EGR target recirculation amount is smaller than the predetermined amount Qe0 may be adjusted by an open-loop control to be a predetermined opening according to the low-pressure EGR target recirculation amount (the opening which becomes larger as the low-pressure EGR target recirculation amount becomes larger as illustrated in FIG. 4); however, in this embodiment, the opening of the low-pressure EGR valve 62 is adjusted by a feedback control so that the amount of exhaust gas recirculated by the low-pressure EGR passage 60 is accurately adjusted to the low-pressure EGR target recirculation amount.

Specifically, the control unit 100 first calculates an intake air fill amount to be introduced into the engine 1 based on the gas temperature detected by the intake gas temperature sensor 38 and the gas pressure detected by the intake pressure sensor 39. The intake air fill amount is the sum of an amount of fresh air introduced into the intake passage 30 and the amount of exhaust gas recirculated from the exhaust passage 40 to the intake passage 30 (in the "LP" region, the exhaust gas recirculated by the low-pressure EGR passage 60, and in the "cooler-side HP+LP" and "cooler bypass-side HP+LP" regions, the exhaust gas recirculated by the high-pressure and low-pressure EGR passages 50 and 60). The intake air fill amount corresponds to a total amount of intake gas introduced into the engine 1, and the flow rate of intake air detected by the airflow sensor 32 corresponds to the fresh air amount. Therefore, the intake gas temperature sensor 38 and the intake pressure sensor 39 configure a total intake gas amount detector for detecting the total amount of intake gas introduced into the engine 1, and the airflow sensor 32 configures a fresh air amount detector for detecting the amount of fresh air introduced into the engine 1.

Further, the control unit 100 calculates an actual recirculation amount of exhaust gas (in the "LP" region, an actual amount of exhaust gas recirculated by the low-pressure EGR passage 60) by subtracting the fresh air amount from the intake air fill amount (total intake gas amount), and the control unit 100 feedback-controls the opening of the low-pressure EGR valve 62 with the exhaust shutter valve 48 fixed fully open so that the actual recirculation amount becomes the low-pressure EGR target recirculation amount.

Moreover, in the case where the gear range of the automatic transmission inputted from the transmission control device 75 is other than the predetermined low-speed gear range, when the low-pressure EGR target recirculation amount is larger than the predetermined amount Qe0, as illustrated in FIG. 4, the control unit 100 fixes the low-pressure EGR valve 62 fully open and sets the opening of the exhaust shutter valve 48 to an opening which allows the recirculation amount of exhaust gas to be the low-pressure EGR target recirculation amount. Specifically, when the low-pressure EGR target recirculation amount becomes larger than the predetermined amount Qe0, since the recirculation amount of exhaust gas cannot be increased anymore with the low-pressure EGR valve 62 fully open already, the difference between the pressures on the exhaust passage 40 side and the intake passage 30 side of the low-pressure EGR valve 62 in the low-pressure EGR passage 60 is increased by closing the exhaust shutter valve 48, so as to increase the recirculation amount of exhaust gas. Therefore, the exhaust shutter valve 48 is gradually narrowed as the low-pressure EGR target recirculation amount becomes larger.

The opening of the exhaust shutter valve 48 when the low-pressure EGR target recirculation amount is larger than the predetermined amount Qe0 may be adjusted, by an open-loop control, to be an opening determined in advance according to the low-pressure EGR target recirculation amount (the opening which becomes smaller as the low-pressure EGR target recirculation amount becomes larger as illustrated in FIG. 4); however, in this embodiment, the opening of the exhaust shutter valve 48 is adjusted by a feedback control so that the amount of exhaust gas recirculated by the low-pressure EGR passage 60 is accurately adjusted to the low-pressure EGR target recirculation amount. Specifically, the control unit 100 feedback-controls the opening of the exhaust shutter valve 48 with the low-pressure EGR valve 62 fixed fully open so that the actual recirculation amount becomes the low-pressure EGR target recirculation amount.

Figure 5:
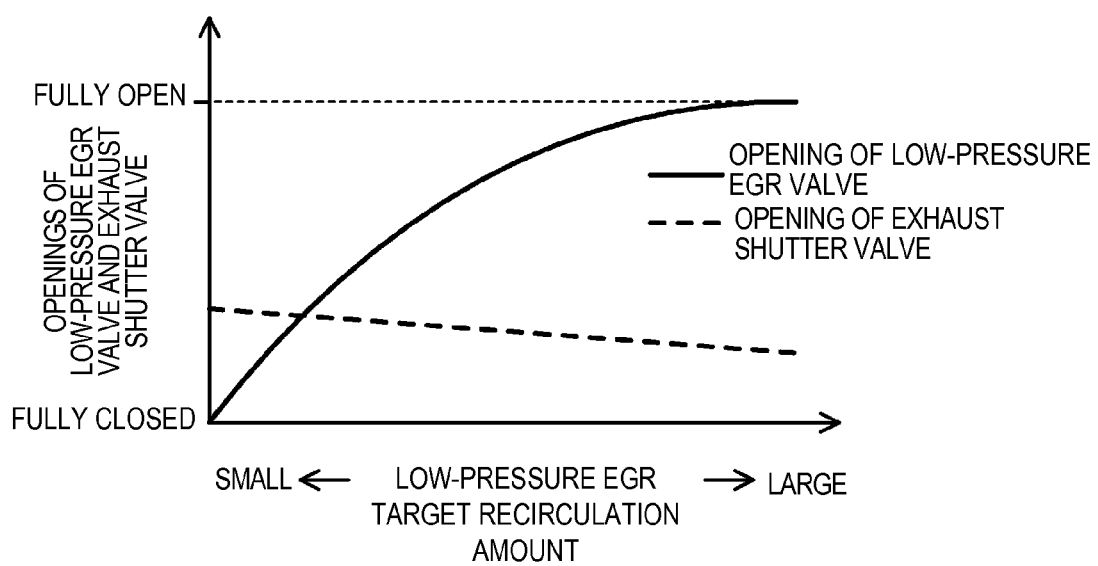
FIG. 5 is a chart illustrating a relationship between the low-pressure EGR target recirculation amount and each of the openings of the low-pressure EGR valve and the exhaust shutter valve, when the automatic transmission is in the first gear range.

On the other hand, in a case where the gear range of the automatic transmission inputted from the transmission control device 75 is the predetermined low-speed gear range (in this embodiment, the first gear range), as illustrated in FIG. 5, the control unit 100 sets the opening of the exhaust shutter valve 48 to an opening that is determined in advance according to the low-pressure EGR target recirculation amount and is larger than fully closed but smaller than fully open, and the control unit 100 also sets the opening of the low-pressure EGR valve 62 to the opening which allows the recirculation amount of exhaust gas to be the low-pressure EGR target recirculation amount with the exhaust shutter valve 48 set at the predetermined opening. The predetermined opening becomes smaller as the low-pressure EGR target recirculation amount becomes larger, and changes between 20% and 30%, for example.

Specifically, when the automatic transmission is in the first gear range, the engine speed changes greatly with respect to the accelerator position, and the low-pressure EGR target recirculation amount also changes greatly according to the change in the engine speed. In this case, if the exhaust shutter valve 48 is fully open, the difference between the pressures on the exhaust passage 40 side and the intake passage 30 side of the low-pressure EGR valve 62 in the low-pressure EGR passage 60 is comparatively small. Therefore, while the low-pressure EGR target recirculation amount changes significantly, in order to reach the changed low-pressure EGR target recirculation amount by the low-pressure EGR valve 62, the opening of the low-pressure EGR valve 62 needs to be changed greatly, which causes a problem that a follow-up responsiveness of the opening of the low-pressure EGR valve 62 with respect to the change in the low-pressure EGR target recirculation amount degrades.

Therefore, when the automatic transmission is in the first gear range, the opening of the exhaust shutter valve 48 is set to the small opening as described above. Thus, even if the low-pressure EGR target recirculation amount changes greatly, the required change amount of the opening of the low-pressure EGR valve 62 for reaching the changed low-pressure EGR target recirculation amount can be small, and as a result, the follow-up responsiveness of the opening of the low-pressure EGR valve 62 with respect to the change in the low-pressure EGR target recirculation amount improves.

The opening of the low-pressure EGR valve 62 when the automatic transmission is in the first gear range may be adjusted, by an open-loop control, to be a predetermined opening according to the low-pressure EGR target recirculation amount (the opening which becomes larger as the low-pressure EGR target recirculation amount becomes larger as illustrated in FIG. 5); however, in this embodiment, the control unit 100 performs a feedback control to adjust the opening of the low-pressure EGR valve 62 so that the actual recirculation amount becomes the low-pressure EGR target recirculation amount with the opening of the exhaust shutter valve 48 set at the predetermined opening. The reason why the opening of the low-pressure EGR valve 62 is feedback-controlled instead of the opening of the exhaust shutter valve 48, is because the controllability of the feedback control can be improved. In other words, while the exhaust shutter valve 48 changes the cross-sectional area of the exhaust passage 40 having a large diameter, the low-pressure EGR valve 62 changes the cross-sectional area of the low-pressure EGR passage 60 having a smaller diameter than that of the exhaust passage 40, and therefore, the low-pressure EGR valve 62 can control the recirculation amount more finely than the exhaust shutter valve 48. As a result, the low-pressure EGR valve 62 can improve the controllability of the feedback control.

Moreover, in the "cooler-side HP+LP" region, the control unit 100 controls, in addition to the openings of the low-pressure EGR valve 62 and the exhaust shutter valve 48, the opening of the cooler-side EGR valve 54 so that the amount of exhaust gas recirculated by the cooler-side passage 51 becomes the high-pressure EGR target recirculation amount set in advance in the map. Specifically, based on the difference between the exhaust gas pressure detected by the exhaust pressure sensor 41 and the gas pressure detected by the intake pressure sensor 39, and the high-pressure EGR target recirculation amount, the opening which allows the amount of exhaust gas recirculated by the cooler-side passage 51 to be the high-pressure EGR target recirculation amount is calculated, and the opening of the cooler-side EGR valve 54 is set to the calculated opening. Note that in this embodiment, by using the calculated opening as a basic opening (the control of setting the basic opening is referred to as the basic control), a first correction control and a second correction control are performed as described later, in addition to the basic control.

The control of the openings of the low-pressure EGR valve 62 and the exhaust shutter valve 48 in the "cooler-side HP+LP" region is similar to the control in the "LP" region, in which the feedback control of the opening of the low-pressure EGR valve 62 when the automatic transmission is in other than the first gear range (in any one of the second to sixth gear ranges) and the low-pressure EGR target recirculation amount is smaller than the predetermined amount Qe0, the feedback control of the opening of the exhaust shutter valve 48 when the automatic transmission is in other than the first gear range and the low-pressure EGR target recirculation amount is larger than the predetermined amount Qe0, and the feedback control of the opening of the low-pressure EGR valve when the automatic transmission is in the first gear range are performed similarly to those in the "LP" region.

Note that when the exhaust gas is recirculated by both of the low-pressure and high-pressure EGR passages 60 and 50 as in the "cooler-side HP+LP" region, in the feedback control of the opening of either one of the low-pressure EGR valve 62 and the exhaust shutter valve 48, the control unit 100 uses, instead of the actual recirculation amount, a low-pressure EGR actual recirculation amount calculated by subtracting the fresh air amount and the high-pressure EGR target recirculation amount from the total intake gas amount, to feedback-control the opening of either one of the low-pressure EGR valve 62 and the exhaust shutter valve 48 so that the low-pressure EGR actual recirculation amount becomes the low-pressure EGR target recirculation amount. In the "cooler-side HP+LP" region, the actual recirculation amount described above is the sum of the low-pressure EGR actual recirculation amount which is the actual amount of exhaust gas recirculated by the low-pressure EGR passage 60, and the actual amount of exhaust gas recirculated by the cooler-side passage 51. Note that in this embodiment, in the calculation of the low-pressure EGR actual recirculation amount, the high-pressure EGR target recirculation amount substitutes for the actual amount of exhaust gas recirculated by the cooler-side passage 51.

Further, the control unit 100 performs the first correction control on the basic opening of the high-pressure EGR valve (in the "cooler-side HP+LP" region, the cooler-side EGR valve 54) set in the basic control, so that the amount of exhaust gas recirculated by the high-pressure EGR passage 50 is corrected by a deviation amount between the low-pressure EGR actual recirculation amount and the low-pressure EGR target recirculation amount during the feedback control.

Specifically, in the feedback control, a time delay occurs for the low-pressure EGR actual recirculation amount to become the low-pressure EGR target recirculation amount, and an excess/deficiency of the low-pressure EGR actual recirculation amount with respect to the low-pressure EGR target recirculation amount occurs during the time delay. Therefore, when the exhaust gas is recirculated by both of the low-pressure and high-pressure EGR passages 60 and 50, first, the opening of either one of the low-pressure EGR valve 62 and the exhaust shutter valve 48 is feedback-controlled so that the low-pressure EGR actual recirculation amount becomes the low-pressure EGR target recirculation amount as described above. Then, the excess/deficiency amount (deviation amount) of the low-pressure EGR actual recirculation amount with respect to the low-pressure EGR target recirculation amount caused by the time delay in the feedback control is corrected on the high-pressure EGR valve side. In other words, when the low-pressure EGR actual recirculation amount is less than the low-pressure EGR target recirculation amount, the amount of exhaust gas recirculated by the high-pressure EGR passage 50 is increased compared to the amount corresponding to the opening of the high-pressure EGR valve set by the basic control, and when the low-pressure EGR actual recirculation amount exceeds the low-pressure EGR target recirculation amount, the amount of exhaust gas recirculated by the high-pressure EGR passage 50 is reduced compared to the amount corresponding to the opening of the high-pressure EGR valve set by the basic control, so that the total amount of exhaust gas recirculated by the low-pressure and high-pressure EGR passages becomes a total target recirculation amount which is the sum of the low-pressure EGR target recirculation amount and the high-pressure EGR target recirculation amount. Note that if the deviation is zero, a first correction amount in the first correction control becomes zero.

Here, the deviation is a deviation between the low-pressure EGR actual recirculation amount at a timing before the current timing by a predetermined period of time, and the low-pressure EGR target recirculation amount at the current timing, and the predetermined time period is desirable to correspond to a delayed period of time for the exhaust gas recirculated by the low-pressure EGR passage 60 to arrive at the connected part of the intake passage 30 to the high-pressure EGR passage 50, compared to the exhaust gas recirculated by the high-pressure EGR passage 50. In this embodiment, the predetermined time period is set to correspond to the arrival delayed period of time. Specifically, since the connected part of the intake passage 30 to the low-pressure EGR passage 60 is positioned upstream of the connected part to the high-pressure EGR passage 50, the exhaust gas recirculated by the low-pressure EGR passage 60 arrives at the connected part of the intake passage 30 to the high-pressure EGR passage 50 (and consequently to the cylinder of the engine 1) with the predetermined period of time of delay compared to the exhaust gas recirculated by the high-pressure EGR passage 50. Thus, a more accurate deviation can be obtained through correcting the amount of exhaust gas recirculated by the high-pressure EGR passage 50 by the deviation amount between the low-pressure EGR actual recirculation amount at the timing before the current timing by the predetermined time period and the low-pressure EGR target recirculation amount at the current timing, and as a result, the total amount of exhaust gas recirculated by the low-pressure and high-pressure EGR passages 60 and 50 can be adjusted to the total target recirculation amount more accurately.

Moreover, when the low-pressure EGR target recirculation amount is changed, after this change, for the predetermined time period corresponding to the delayed time period for the exhaust gas recirculated by the low-pressure EGR passage to arrive at the connected part of the intake passage to the high-pressure EGR passage compared to the exhaust gas recirculated by the high-pressure EGR passage, instead of the first correction control, the control unit 100 performs the second correction control on the opening of the high-pressure EGR valve set by the basic control so that the amount of exhaust gas recirculated by the high-pressure EGR passage 50 is corrected by the amount corresponding to the difference in the low-pressure EGR target recirculation amount before and after being changed. The first correction control is performed after the predetermined time period.

Specifically, when the operating state of the engine 1 changes and the low-pressure EGR target recirculation amount is changed, even after this change, for the predetermined time period, the exhaust gas flows with the low-pressure EGR target recirculation amount before being changed. Therefore, for the predetermined time period after the change in the low-pressure EGR target recirculation amount, the amount of exhaust gas recirculated by the high-pressure EGR passage 50 is corrected by the amount corresponding to the difference in the low-pressure EGR target recirculation amount before and after being changed. For example, when the low-pressure EGR target recirculation amount is changed to be smaller than before, for the predetermined time period after the change, the amount of exhaust gas recirculated by the high-pressure EGR passage 50 is reduced. Therefore, also for the predetermined time period after the change in the low-pressure EGR target recirculation amount, the total amount of exhaust gas recirculated by the low-pressure and high-pressure EGR passages 60 and 50 can be adjusted to the total target recirculation amount more accurately.

Further, in the "cooler bypass-side HP+LP" region, the control unit 100 controls, in addition to the openings of the low-pressure EGR valve 62 and the exhaust shutter valve 48, the opening of the cooler bypass-side EGR valve 55 so that the amount of exhaust gas recirculated by the cooler bypass-side passage 52 becomes the high-pressure EGR target recirculation amount which is set in advance in the map. In other words, based on the difference between the exhaust gas pressure detected by the exhaust pressure sensor 41 and the gas pressure detected by the intake pressure sensor 39, and the high-pressure EGR target recirculation amount, the opening which allows the amount of exhaust gas recirculated by the cooler bypass-side passage 52 to be the high-pressure EGR target recirculation amount is calculated, and the opening of the cooler bypass-side EGR valve 55 is set to the calculated opening. In this embodiment, by using the calculated opening as a basic opening, the first correction control and the second correction control are performed on the basic opening as described above.

The control of the openings of the low-pressure EGR valve 62 and the exhaust shutter valve 48 in the "cooler bypass-side HP+LP" region is similar to the control in the "cooler-side HP+LP" region, and the control unit 100 uses, instead of the actual recirculation amount, the low-pressure EGR actual recirculation amount calculated by subtracting the fresh air amount and the high-pressure EGR target recirculation amount from the total intake gas amount, to feedback-control the opening of either one of the low-pressure EGR valve 62 and the exhaust shutter valve 48 so that the low-pressure EGR actual recirculation amount becomes the low-pressure EGR target recirculation amount. In the "cooler bypass-side HP+LP" region, the actual recirculation amount described above is the sum of the low-pressure EGR actual recirculation amount and the actual amount of exhaust gas recirculated by the cooler bypass-side passage 52.

Moreover, the control of the high-pressure EGR valve (cooler bypass-side EGR valve 55) in the "cooler bypass-side HP+LP" region is also similar to the control in the "cooler-side HP+LP" region, where the basic control and either one of the first and second correction control are performed.

Figure 6:
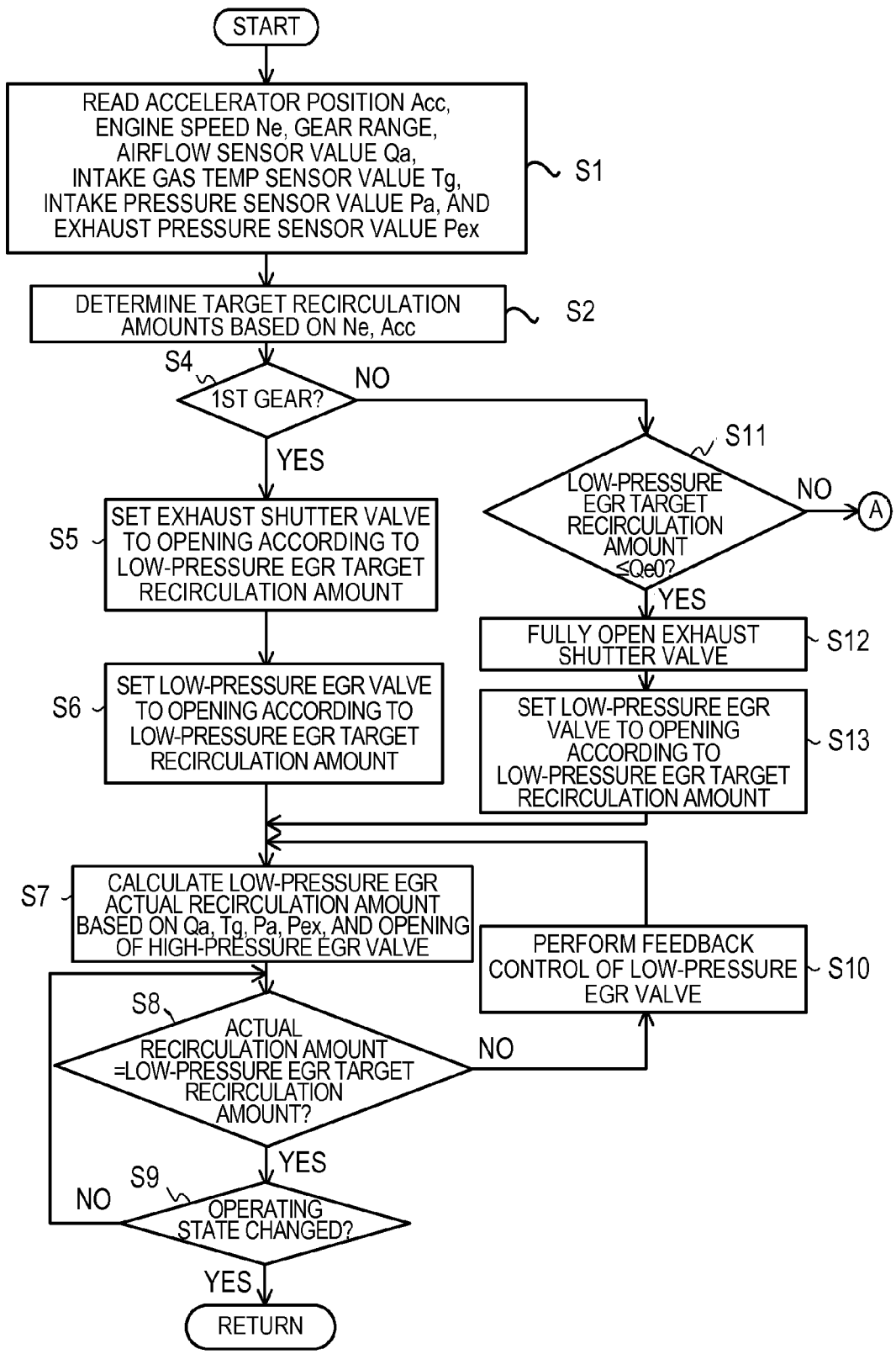
FIG. 6 is a flowchart illustrating a part of control operation of the low-pressure EGR valve and the exhaust shutter valve, performed by a control unit.
Figure 7:
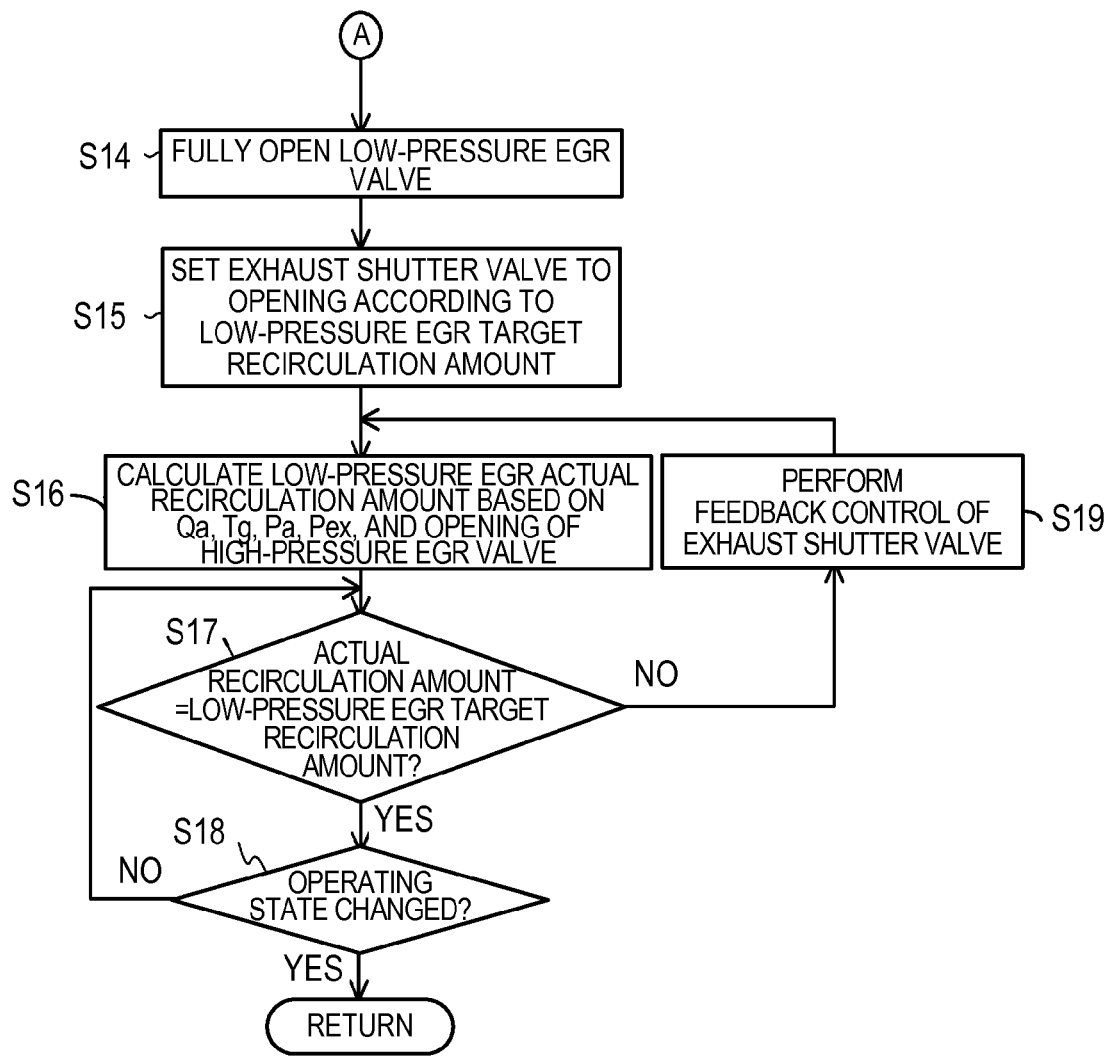
FIG. 7 is a flowchart illustrating the rest of the control operation of the low-pressure EGR valve and the exhaust shutter valve, performed by the control unit.
Figure 8:
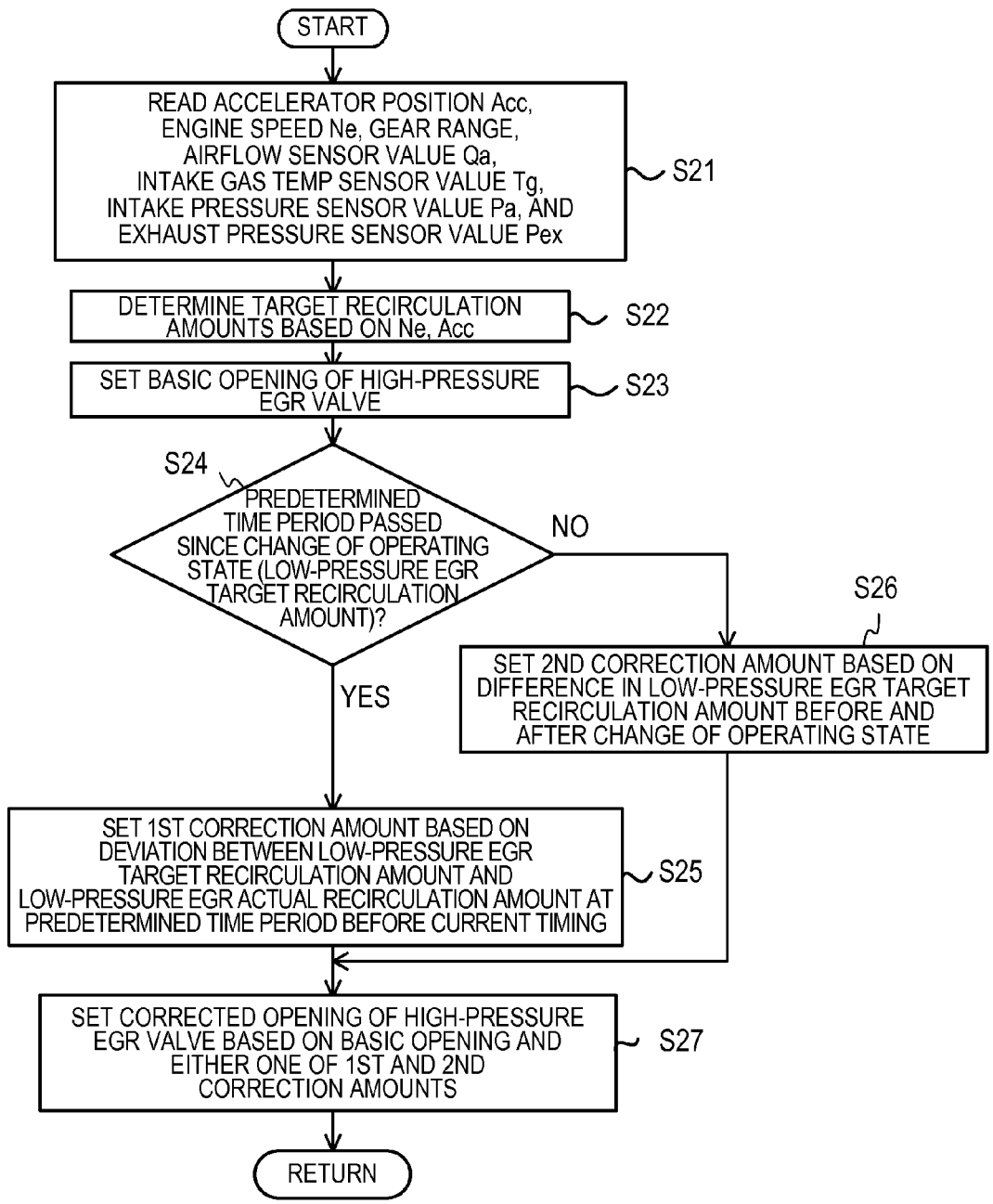
FIG. 8 is a flowchart illustrating control operation of a high-pressure EGR valve (a cooler-side EGR valve and a cooler bypass-side EGR valve), performed by the control unit.

Here, the control operation of the low-pressure EGR valve 62 and the exhaust shutter valve 48 performed by the control unit 100 is described based on the flowcharts in FIGS. 6 and 7, and the control operation of the high-pressure EGR valve (the cooler-side EGR valve 54 and the cooler bypass-side EGR valve 55) performed by the control unit 100 is described based on the flowchart in FIG. 8.

First, at S1, an accelerator position Acc from the accelerator position sensor 71, the engine speed Ne from the engine speed sensor 9, the gear range of the automatic transmission from the transmission control device 75, a sensor value Qa from the airflow sensor 32, a sensor value Tg from the intake gas temperature sensor 38, a sensor value Pa from the intake pressure sensor 39, and a sensor value Pex from the exhaust pressure sensor 41 are read.

Figure 3:
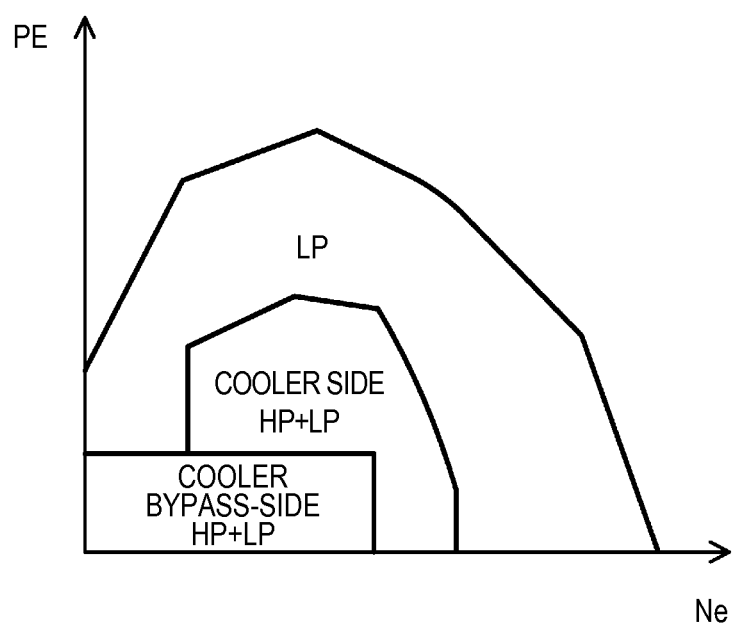
FIG. 3 is a view illustrating a map for determining a low-pressure EGR target recirculation amount and a high-pressure EGR target recirculation amount based on an engine speed and an engine load.

Next, at S2, based on the engine speed Ne and the accelerator position Acc (corresponding to the engine load PE), the low-pressure and high-pressure EGR target recirculation amounts (and the total target recirculation amount which is the sum of the low-pressure EGR target recirculation amount and the high-pressure EGR target recirculation amount) are determined according to the map in FIG. 3. Note that in the "LP" region, the high-pressure EGR target recirculation amount becomes zero, and the low-pressure EGR target recirculation amount and the total target recirculation amount become the same value.

Next, at S4, whether the automatic transmission is in the first gear range is determined, and if the result at S4 is positive, the operation proceeds to S5; whereas if the result at S4 is negative (i.e., the automatic transmission is in any one of the second to sixth gear ranges), the operation proceeds to S11.

At S5, the exhaust shutter valve 48 is set to the opening which is determined according to the low-pressure EGR target recirculation amount (the predetermined opening larger than fully closed but smaller than fully open), and next, at S6, the low-pressure EGR valve 62 is set to the opening which is determined according to the low-pressure EGR target recirculation amount, in other words, the opening which allows the recirculation amount of exhaust gas to be the low-pressure EGR target recirculation amount with the exhaust shutter valve 48 set at the predetermined opening.

Next, at S7, the low-pressure EGR actual recirculation amount is calculated based on the airflow sensor value Qa, the intake gas temperature sensor value Tg, the intake pressure sensor value Pa, the exhaust pressure sensor value Pex, and the opening of the high-pressure EGR valve. In the "LP" region, the low-pressure EGR actual recirculation amount is the actual amount of exhaust gas recirculated by the low-pressure EGR passage 60, and is calculated by subtracting the fresh air amount from the total intake gas amount. In the "cooler-side HP+LP" region and the "cooler bypass-side HP+LP" region, the low-pressure EGR actual recirculation amount is calculated by subtracting the fresh air amount and the amount of exhaust gas recirculated by the high-pressure EGR passage 50, from the total intake gas amount, the amount of exhaust gas recirculated by the high-pressure EGR passage 50 being calculated based on the difference between the intake pressure sensor value Pa and the exhaust pressure sensor value Pex, and the opening of the high-pressure EGR valve.

Next, at S8, whether the low-pressure EGR actual recirculation amount (in the flowchart, simply described as the "actual recirculation amount") matches with the low-pressure EGR target recirculation amount is determined. If the result at S8 is positive, the operation proceeds to S9; whereas if the result at S8 is negative, the operation proceeds to S10.

At S9, whether the operating state of the engine 1 (the engine speed Ne and the accelerator position Acc) has changed, in other words, whether the low-pressure and high-pressure EGR target recirculation amounts have changed, is determined. If the result at S9 is positive, the operation returns back to START; whereas if the result at S9 is negative, the operation returns back to S8.

At S10 to which the operation proceeds when the result at S8 is negative, the low-pressure EGR valve 62 is feedback-controlled so that the low-pressure EGR actual recirculation amount becomes the low-pressure EGR target recirculation amount, and the operation returns back to S7 thereafter.

At S11 to which the operation proceeds when the result at S4 is negative, whether the low-pressure EGR target recirculation amount is smaller than Qe0 is determined, and if the result at S11 is positive, the operation proceeds to S12; whereas if the result at S11 is negative, the operation proceeds to S14.

At S12, the exhaust shutter valve 48 is fully opened, and next, at S13, the low-pressure EGR valve 62 is set to the opening which is determined according to the low-pressure EGR target recirculation amount, in other words, the opening which allows the recirculation amount of exhaust gas to be the low-pressure EGR target recirculation amount with the exhaust shutter valve 48 fully open, and the operation proceeds to S7 thereafter. Thus, similarly to the case where the automatic transmission is in the first gear range, if the low-pressure EGR actual recirculation amount does not match with the low-pressure EGR target recirculation amount, the low-pressure EGR valve 62 is feedback-controlled so that the actual recirculation amount becomes the total target recirculation amount.

At S14 to which the operation proceeds when the result at S11 is negative, the low-pressure EGR valve 62 is fully opened, and next, at S15, the exhaust shutter valve 48 is set to the opening which is determined according to the low-pressure EGR target recirculation amount, in other words, the opening which allows the recirculation amount of exhaust gas to be the low-pressure EGR target recirculation amount with the low-pressure EGR valve 62 fully open.

Next, at S16, the low-pressure EGR actual recirculation amount is calculated based on the airflow sensor value Qa, the intake gas temperature sensor value Tg, the intake pressure sensor value Pa, the exhaust pressure sensor value Pex, and the opening of the high-pressure EGR valve. Similarly to the low-pressure EGR actual recirculation amount at S7, in the "LP" region, the low-pressure EGR actual recirculation amount at S16 is also the actual amount of exhaust gas recirculated by the low-pressure EGR passage 60 and is calculated by subtracting the fresh air amount from the total intake gas amount, and in the "cooler-side HP+LP" region and the "cooler bypass-side HP+LP" region, the low-pressure EGR actual recirculation amount at S16 is calculated by subtracting the fresh air amount and the amount of exhaust gas recirculated by the high-pressure EGR passage 50, from the total intake gas amount, the amount of exhaust gas recirculated by the high-pressure EGR passage 50 being calculated based on the difference between the intake pressure sensor value Pa and the exhaust pressure sensor value Pex, and the opening of the high-pressure EGR valve.

Next, at S17, whether the low-pressure EGR actual recirculation amount (in the flowchart simply described as the "actual recirculation amount") matches with the low-pressure EGR target recirculation amount is determined. If the result at S17 is positive, the operation proceeds to S18; whereas if the result at S17 is negative, the operation proceeds to S19.

At S18, whether the operating state of the engine 1 (the engine speed Ne and the accelerator position Acc) has changed, in other words, whether the low-pressure and high-pressure EGR target recirculation amounts have changed, is determined. If the result at S18 is positive, the operation returns back to START; whereas if the result at S18 is negative, the operation returns back to S17.

At S19 to which the operation proceeds when the result at S17 is negative, the exhaust shutter valve 48 is feedback-controlled so that the low-pressure EGR actual recirculation amount becomes the low-pressure EGR target recirculation amount, and the operation returns back to S16 thereafter.

On the other hand, in the control of the high-pressure EGR valve, first, at S21, the accelerator position Acc from the accelerator position sensor 71, the engine speed Ne from the engine speed sensor 9, the gear range of the automatic transmission from the transmission control device 75, the sensor value Qa from the airflow sensor 32, the sensor value Tg from the intake gas temperature sensor 38, the sensor value Pa from the intake pressure sensor 39, and the sensor value Pex from the exhaust pressure sensor 41 are read.

Next, at S22, based on the engine speed Ne and the accelerator position Acc (corresponding to the engine load PE), the low-pressure and high-pressure EGR target recirculation amounts (and the total target recirculation amount which is the sum of the low-pressure EGR target recirculation amount and the high-pressure EGR target recirculation amount) are determined according to the map in FIG. 3. Note that in the "LP" region, the high-pressure target recirculation amount becomes zero.

Next, at S23, the basic opening of the high-pressure EGR valve (the cooler-side EGR valve 54 and the cooler bypass-side EGR valve 55) is set based on the difference between the exhaust pressure sensor value Pex and the intake pressure sensor value Pa (Pex−Pa), and the high-pressure EGR target recirculation amount (i.e., by the basic control).

Next, at S24, whether the predetermined time period has passed since the change in the operating state of the engine 1 to the current operating state, in other words, since the change in the low-pressure EGR target recirculation amount to the current target recirculation amount, is determined.

If the result at S24 is positive, the operation proceeds to S25, where the deviation between the low-pressure EGR target recirculation amount (current low-pressure EGR target recirculation amount) and the low-pressure EGR actual recirculation amount at the timing before the current timing by the predetermined time period is calculated, and in order to compensate for the deviation, the first correction amount is set for the basic opening of the high-pressure EGR valve set by the basic control, and the operation proceeds to S27.

On the other hand, if the result at S24 is negative, the operation proceeds to S26, where the difference in the low-pressure EGR target recirculation amount before and after the change in the operating state of the engine 1 is set as a second correction amount for the basic opening, and the operation proceeds to S27.

At S27, the corrected opening of the high-pressure EGR valve is set based on the basic opening and either one of the first and second correction amounts, and the operation returns back to START thereafter.

Therefore, in this embodiment, in the case where the automatic transmission is in other than the predetermined low-speed gear range (in any one of the second to sixth gear ranges in this embodiment), when the low-pressure EGR target recirculation amount which is set in advance according to the operating state of the engine 1 is smaller than the predetermined amount Qe0, in the state where the exhaust shutter valve 48 is fixed fully open, the opening of the low-pressure EGR valve 62 is feedback-controlled so that the low-pressure EGR actual recirculation amount calculated by subtracting the fresh air amount and the high-pressure EGR target recirculation amount from the total intake gas amount (in the "LP" region, the actual recirculation amount calculated by subtracting the fresh air amount from the total intake gas amount) becomes the low-pressure EGR target recirculation amount. Moreover, when the low-pressure EGR target recirculation amount is larger than the predetermined amount Qe0, in the state where the low-pressure EGR valve 62 is fixed fully open, the opening of the exhaust shutter valve 48 is feedback-controlled so that the low-pressure EGR actual recirculation amount (in the "LP" region, the actual recirculation amount calculated by subtracting the fresh air amount from the total intake gas amount) becomes the low-pressure EGR target recirculation amount.

On the other hand, in the case where the automatic transmission is in the predetermined low-speed gear range (the first gear range in this embodiment), in the state where the opening of the exhaust shutter valve 48 is set to the predetermined opening which is larger than fully closed but smaller than fully open according to the low-pressure EGR target recirculation amount, the opening of the low-pressure EGR valve 62 is feedback-controlled so that the low-pressure EGR actual recirculation amount (in the "LP" region, the actual recirculation amount calculated by subtracting the fresh air amount from the total intake gas amount) becomes the low-pressure EGR target recirculation amount. Thus, when the engine is in operation with the transmission being in other than the predetermined low-speed gear range, the fuel consumption can be kept low by reducing an exhaust pressure loss of the turbine 20b of the exhaust turbocharger 20 as much as possible, and when the engine is in operation with the transmission being in the predetermined low-speed gear range (when the engine is in operation where the engine speed changes greatly with respect to the accelerator position and the low-pressure EGR target recirculation amount also changes greatly according to the change in the engine speed), the follow-up responsiveness of the opening of the low-pressure EGR valve 62 with respect to the change in the low-pressure EGR target recirculation amount can be improved.

Moreover, when the exhaust gas is recirculated by both of the low-pressure and high-pressure EGR passages 60 and 50, in the feedback control of the opening of either one of the low-pressure EGR valve 62 and the exhaust shutter valve 48, the opening of either one of the low-pressure EGR valve 62 and the exhaust shutter valve 48 is feedback-controlled so that the low-pressure EGR actual recirculation amount, instead of the actual recirculation amount described above, becomes the low-pressure EGR target recirculation amount, and the opening of the high-pressure EGR valve is set such that it is adjusted from the basic opening which is set by the basic control, in view of the excess/deficiency of the low-pressure EGR actual recirculation amount with respect to the low-pressure EGR target recirculation amount due to the time delay in the feedback control, and the delay of the exhaust gas recirculated by the low-pressure EGR passage 60 due to the connected part of the intake passage 30 to the low-pressure EGR passage 60 being positioned upstream of the connected part to the high-pressure EGR passage 50. Therefore, the total amount of exhaust gas recirculated by the low-pressure and high-pressure EGR passages 60 and 50 can be accurately adjusted to the total target recirculation amount.

The present invention is not limited to this embodiment, and may be modified without deviating from the spirit and scope of the claims.

For example, in this embodiment, the predetermined low-speed gear range is the first gear range; however, without being limiting to this, it may be the first and second gear ranges. In this case, also when the automatic transmission is in the second gear range, the control as in the first gear range in this embodiment is performed.

Moreover, in this embodiment, only one exhaust turbocharger 20 is provided for the engine 1; however, two or more exhaust turbochargers may be provided. In this case, the low-pressure EGR passage 60 connects the part of the exhaust passage 40 downstream of the turbine which is positioned the furthest downstream among all the turbines, to the part of the intake passage 30 upstream of the compressor which is positioned the furthest upstream among all the compressors. Moreover, the high-pressure EGR passage 50 connects the part of the exhaust passage 40 upstream of the turbine which is positioned the furthest upstream among all the turbines, to the part of the intake passage 30 downstream of the compressor which is positioned the furthest downstream among all the compressors.

The above-described embodiment is merely an illustration, and therefore, it must not be interpreted in a limited way. The scope of the present invention is defined by the following claims, and all of modifications and changes falling under the equivalent range of the claims are within the scope of the present invention.

The present invention is effective for an exhaust gas recirculation control device for an engine, which includes an exhaust turbocharger having a turbine disposed in an exhaust passage of the engine and a compressor disposed in an intake passage, a low-pressure EGR passage connecting a part of the exhaust passage downstream of the turbine to a part of the intake passage upstream of the compressor, a low-pressure EGR valve disposed in the low-pressure EGR passage and for changing a cross-sectional area of the low-pressure EGR passage, an exhaust shutter valve disposed downstream of a connected part of the exhaust passage to the low-pressure EGR passage and for changing a cross-sectional area of the exhaust passage, and a valve control device for controlling openings of the low-pressure EGR valve and the exhaust shutter valve so that an amount of exhaust gas of the engine recirculated by the low-pressure EGR passage becomes a low-pressure EGR target recirculation amount set in advance according to an operating state of the engine.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

Description of Reference Characters

1 Engine
20 Exhaust Turbocharger
20a Compressor
20b Turbine
30 Intake Passage
32 Airflow Sensor (Fresh Air Amount Detector)
38 Intake Gas Temperature Sensor (Total Intake Gas Amount Detector)
39 Intake Pressure Sensor (Total Intake Gas Amount Detector)
40 Exhaust Passage
48 Exhaust Shutter Valve
50 High-pressure EGR Passage
51 Cooler-side Passage
52 Cooler Bypass-side Passage
54 Cooler-side EGR Valve (High-pressure EGR Valve)
55 Cooler Bypass-side EGR Valve (High-pressure EGR Valve)
60 Low-pressure EGR Passage
62 Low-pressure EGR Valve
75 Transmission Control Device (Gear Range Detector)
100 Control Unit (Valve Control Device)

What is claimed is:

1. A turbocharged internal combustion engine having an exhaust gas recirculation (EGR) control system, comprising:
  an exhaust turbocharger having a turbine disposed in an exhaust passage of the engine and a compressor disposed in an intake passage;
  a low-pressure EGR passage connecting a part of the exhaust passage downstream of the turbine to a part of the intake passage upstream of the compressor;
  a low-pressure EGR valve disposed in the low-pressure EGR passage and for changing a cross-sectional area of the low-pressure EGR passage;
  an exhaust shutter valve disposed downstream of the connected part of the exhaust passage to the low-pressure EGR passage, and for changing a cross-sectional area of the exhaust passage;
  a valve controller operatively coupled to the low-pressure EGR valve and the exhaust shutter valve, the valve controller for controlling openings of the low-pressure EGR valve and the exhaust shutter valve so that an amount of exhaust gas of the engine recirculated by the low-pressure EGR passage becomes a low-pressure EGR target recirculation amount that is set in advance according to an operating state of the engine; and
  a gear range detector for detecting a gear range of a transmission of a vehicle in which the engine is installed, the transmission being operable in a plurality of gear ranges including a predetermined low-speed gear range,
  wherein when the gear range detected by the gear range detector is gear range other than the predetermined low-speed gear range among the plurality of gear ranges, and when the low-pressure EGR target recirculation amount is smaller than a predetermined amount, the valve controller fixes the exhaust shutter valve fully open and sets the opening of the low-pressure EGR valve to an opening that allows the recirculation amount of exhaust gas to be the low-pressure EGR target recirculation amount, and when the low-pressure EGR target recirculation amount is larger than the predetermined amount, the valve controller fixes the low-pressure EGR valve fully open and sets the opening of the exhaust shutter valve to an opening that allows the recirculation amount of exhaust gas to be the low-pressure EGR target recirculation amount, and
  wherein when the gear range detected by the gear range detector is the predetermined low-speed gear range, the valve controller sets the opening of the exhaust shutter valve to a predetermined opening that is larger than fully closed but smaller than fully open according to the low-pressure EGR target recirculation amount, and sets the opening of the low-pressure EGR valve to an opening that allows the recirculation amount of the exhaust gas to be the low-pressure EGR target recirculation amount.

2. The turbocharged internal combustion engine of claim 1, further comprising:
  a total intake gas amount detector for detecting a total intake gas amount introduced into the engine; and
  a fresh air amount detector for detecting a fresh air amount introduced into the engine,
  wherein when the gear range detected by the gear range detector is other than the predetermined low-speed gear range, when the low-pressure EGR target recirculation amount is smaller than the predetermined amount, and when the exhaust shutter valve is fixed fully open, the valve controller performs a feedback control of the opening of the low-pressure EGR valve so that an actual recirculation amount becomes the low-pressure EGR target recirculation amount, and when the low-pressure EGR target recirculation amount is larger than the predetermined amount, and when the low-pressure EGR valve is fixed fully open, the valve controller performs a feedback control of the opening of the exhaust shutter valve so that the actual recirculation amount becomes the low-pressure EGR target recirculation amount, the actual recirculation amount calculated by subtracting the fresh air amount detected by the fresh air amount detector from the total intake gas amount detected by the total intake gas amount detector, and
  wherein when the gear range detected by the gear range detector is the predetermined low-speed gear range, and when the opening of the exhaust shutter valve is set to the predetermined opening, the valve controller performs the feedback control of the opening of the low-pressure EGR valve so that the actual recirculation amount becomes the low-pressure EGR target recirculation amount.

3. The turbocharged internal combustion engine of claim 2, further comprising:
  a high-pressure EGR passage connecting a part of the exhaust passage upstream of the turbine to a part of the intake passage downstream of the compressor; and
  a high-pressure EGR valve disposed in the high-pressure EGR passage and for changing a cross-sectional area of the high-pressure EGR passage,
  wherein when the exhaust gas is recirculated by both of the low-pressure and high-pressure EGR passages, the valve controller performs a basic control of an opening of the high-pressure EGR valve so that the amount of exhaust gas of the engine recirculated by the high-pressure EGR passage becomes a high-pressure EGR target recirculation amount that is set in advance according to the operating state of the engine, wherein when the exhaust gas is recirculated by both of the low-pressure and high-pressure EGR passages, in the feedback control of the opening of either one of the low-pressure EGR valve and the exhaust shutter valve, the valve controller uses, instead of the actual recirculation amount, a low-pressure EGR actual recirculation amount to perform the feedback control so that the low-pressure EGR actual recirculation amount becomes the low-pressure EGR target recirculation amount, the low-pressure EGR actual recirculation amount calculated by subtracting the fresh air amount detected by the fresh air amount detector and the high-pressure EGR target recirculation amount from the total intake gas amount detected by the total intake gas amount detector, and wherein when the exhaust gas is recirculated by both of the low-pressure and high-pressure EGR passages, the valve controller performs a first correction control on the opening of the high-pressure EGR valve set in the basic control so that the amount of exhaust gas recirculated by the high-pressure EGR passage is corrected by an amount corresponding to a deviation between the low-pressure EGR actual recirculation amount and the low-pressure EGR target recirculation amount in the feedback control.

4. The turbocharged internal combustion engine of claim 3, wherein the deviation is a deviation between the low-pressure EGR actual recirculation amount at a timing before a current timing by a predetermined period of time and the low-pressure EGR target recirculation amount at the current timing, and wherein the predetermined time period corresponds to a delayed period of time for the exhaust gas recirculated by the low-pressure EGR passage to arrive at the part of the intake passage connected to the high-pressure EGR passage, compared to the exhaust gas recirculated by the high-pressure EGR passage.

5. The turbocharged internal combustion engine of claim 4, wherein when the low-pressure EGR target recirculation amount is changed, for the predetermined time period after the change in the low-pressure EGR target recirculation amount, the valve controller performs, instead of the first correction control, a second correction control on the opening of the high-pressure EGR valve set in the basic control so that the amount of exhaust gas recirculated by the high-pressure EGR passage is corrected by an amount corresponding to a difference between the low-pressure EGR target recirculation amounts before and after being changed.

6. The turbocharged internal combustion engine of claim 3, wherein when the low-pressure EGR target recirculation amount is changed, for a predetermined period of time from the change in the low-pressure EGR target recirculation amount, the valve controller performs, instead of the first correction control, a second correction control on the opening of the high-pressure EGR valve set in the basic control so that the amount of exhaust gas recirculated by the high-pressure EGR passage is corrected by an amount corresponding to a difference between the low-pressure EGR target recirculation amounts before and after being changed, the predetermined time period corresponding to a delayed period of time for the exhaust gas recirculated by the low-pressure EGR passage to arrive at the part of the intake passage connected to the high-pressure EGR passage, compared to the exhaust gas recirculated by the high-pressure EGR passage.

* * * * *